United States Patent
Chen

(10) Patent No.: US 12,506,936 B2
(45) Date of Patent: Dec. 23, 2025

(54) VIDEO SEARCHING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Lizhuo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 306 days.

(21) Appl. No.: 18/303,705

(22) Filed: Apr. 20, 2023

(65) Prior Publication Data
US 2023/0308727 A1    Sep. 28, 2023

Related U.S. Application Data

(63) Continuation of application No. PCT/CN2022/099534, filed on Jun. 17, 2022.

(30) Foreign Application Priority Data

Jul. 29, 2021   (CN) .......................... 202110866590.6

(51) Int. Cl.
*G06F 3/0482* (2013.01)
*G06F 3/0485* (2022.01)
(Continued)

(52) U.S. Cl.
CPC ......... *H04N 21/482* (2013.01); *G06F 3/0482* (2013.01); *G06F 3/0485* (2013.01);
(Continued)

(58) Field of Classification Search
CPC ...... G06F 3/0482; G06F 3/0485; G06F 16/74; G06F 16/732; H04N 21/482;
(Continued)

(56) References Cited

U.S. PATENT DOCUMENTS 10,104,427 B1 * 10/2018 Zabetian ............ H04N 21/8133
2007/0033522 A1 * 2/2007 Lin .......................... G06F 9/451
345/698
(Continued)

FOREIGN PATENT DOCUMENTS

CN    110366027 A    10/2019
CN    305544272 S    1/2020
(Continued)

OTHER PUBLICATIONS

The World Intellectual Property Organization (WIPO) International Search Report for PCT/CN2022/099534 Aug. 29, 2022 6 Pages (including translation).

*Primary Examiner* — Ting Z Lee
(74) *Attorney, Agent, or Firm* — Anova Law Group, PLLC

(57) ABSTRACT

A video searching method includes: displaying a video list interface showing video covers of at least two videos, the video covers each including a cover graph or a cover icon; displaying a picker viewer on the video list interface in response to a search trigger operation, list options of the at least two videos being displayed on the picker viewer, and the list options being used for displaying relevant text of videos corresponding to the list options; and displaying a playing interface of a first video corresponding to a first list option in response to a selection operation on the first list option in the list options of the at least two videos.

19 Claims, 10 Drawing Sheets

(51) Int. Cl.
  G06F 16/74 (2019.01)
  H04N 21/482 (2011.01)
  G06F 16/732 (2019.01)
  H04N 21/414 (2011.01)
  H04N 21/431 (2011.01)
  H04N 21/472 (2011.01)

(52) U.S. Cl.
  CPC ............ G06F 16/74 (2019.01); *G06F 16/732* (2019.01); *H04N 21/41407* (2013.01); *H04N 21/4316* (2013.01); *H04N 21/47217* (2013.01); *H04N 21/4828* (2013.01)

(58) Field of Classification Search
  CPC ......... H04N 21/4828; H04N 21/41407; H04N 21/4316; H04N 21/47217
  See application file for complete search history.

(56) References Cited

U.S. PATENT DOCUMENTS

| | | | |
|---|---|---|---|
| 2007/0067738 A1* | 3/2007 | Flynt | H04M 1/7243 715/810 |
| 2012/0324398 A1 | 12/2012 | Lee et al. | |
| 2015/0062052 A1* | 3/2015 | Bernstein | G06F 3/0416 345/173 |
| 2019/0025999 A1* | 1/2019 | Murphy | G06F 3/0482 |
| 2019/0387084 A1* | 12/2019 | Lee | H04M 1/0266 |
| 2022/0038784 A1* | 2/2022 | Roh | H04N 21/2743 |
| 2022/0353565 A1 | 11/2022 | Chow et al. | |

FOREIGN PATENT DOCUMENTS

| | | |
|---|---|---|
| CN | 112235603 A | 1/2021 |
| CN | 112261226 A | 1/2021 |
| CN | 112989104 A | 6/2021 |

* cited by examiner

VIDEO SEARCHING METHOD AND APPARATUS, DEVICE, AND STORAGE MEDIUM

CROSS-REFERENCES TO RELATED APPLICATIONS

This application is a continuation application of PCT Patent Application No. PCT/CN2022/099534, entitled "VIDEO SEARCH METHOD AND APPARATUS, AND DEVICE, STORAGE MEDIUM AND PROGRAM PRODUCT" and filed on Jun. 17, 2022, which claims the priority of Chinese application No. 202110866590.6, filed on Jul. 29, 2021, entitled "VIDEO SEARCHING METHOD AND APPARATUS, DEVICE, STORAGE MEDIUM, AND PROGRAM PRODUCT", the entire contents of both of which are incorporated herein by reference.

FIELD OF THE TECHNOLOGY

The present disclosure relates to the field of human-computer interaction, and in particular, to a video searching method and apparatus, a device, a storage medium, and a program product.

BACKGROUND OF THE DISCLOSURE

Short videos refer to videos that are suitable for viewing in a mobile state and a short leisure state. The time for playing short videos varies from a few seconds to a few minutes.

In current short video programs, a plurality of short videos taken by the same author are displayed on a video list page. The video list page displays cover graphs of the plurality of short videos using a grid list. Users search for short videos of interest by sliding up and down on the video list page of the author.

A long list is page-loaded by the short video programs. When users slide up and down in the video list page of the author, if video covers of the short videos have not been loaded, the video cover of each short video is displayed as a default icon. At this time, users see some default icons and cannot see effective video information, and thus it is inefficient to search for a specific short video.

SUMMARY

The present disclosure provides a video searching method and apparatus, a device, a storage medium, and a program product, which can simplify operation steps for searching for a video and improve the efficiency for searching for a video. The technical solutions are as follows.

According to one aspect of the present disclosure, provided is a video searching method, the method is performed by a terminal, and the method includes: displaying a video list interface showing video covers of at least two videos, the video covers each including a cover graph or a cover icon; displaying a picker viewer on the video list interface in response to a search trigger operation, list options of the at least two videos being displayed on the picker viewer, and the list options being used for displaying relevant text of videos corresponding to the list options; and displaying a playing interface of a first video corresponding to a first list option in response to a selection operation on the first list option in the list options of the at least two videos.

According to another aspect of the present disclosure, provided is a video searching apparatus, including: a display module, configured to display a video list interface showing video covers of at least two videos, the video covers each including a cover graph or a cover icon; a human-computer interaction module, configured to display a picker viewer on the video list interface in response to a search trigger operation, list options of the at least two videos being displayed on the picker viewer, and the list options being used for displaying relevant text of videos corresponding to the list options; and the human-computer interaction module, configured to display a playing interface of a first video corresponding to a first list option in response to a selection operation on the first list option in the list options of the at least two videos.

According to another aspect of the present disclosure, provided is a computer device. The computer device includes a processor and a memory. The memory stores at least one piece of program loaded and executed by the processor to implement the video searching method according to the above aspect.

According to another aspect of the present disclosure, provided is a non-transitory computer-readable storage medium. The computer-readable storage medium stores at least one piece of program loaded and executed by a processor to implement the video searching method according to the above aspect.

Text contents of the at least two videos are displayed on corresponding list options by displaying the picker viewer on the video list interface, so that users can select target videos according to the text content of each video, thereby solving the problem that users fail to find target videos quickly and accurately on the video list interface and facilitating users to quickly find videos desired to be viewed using the text content of each video when video covers on the video list interface are default icons or do not carry sufficient effective information.

DESCRIPTION OF EMBODIMENTS

Figure 1:
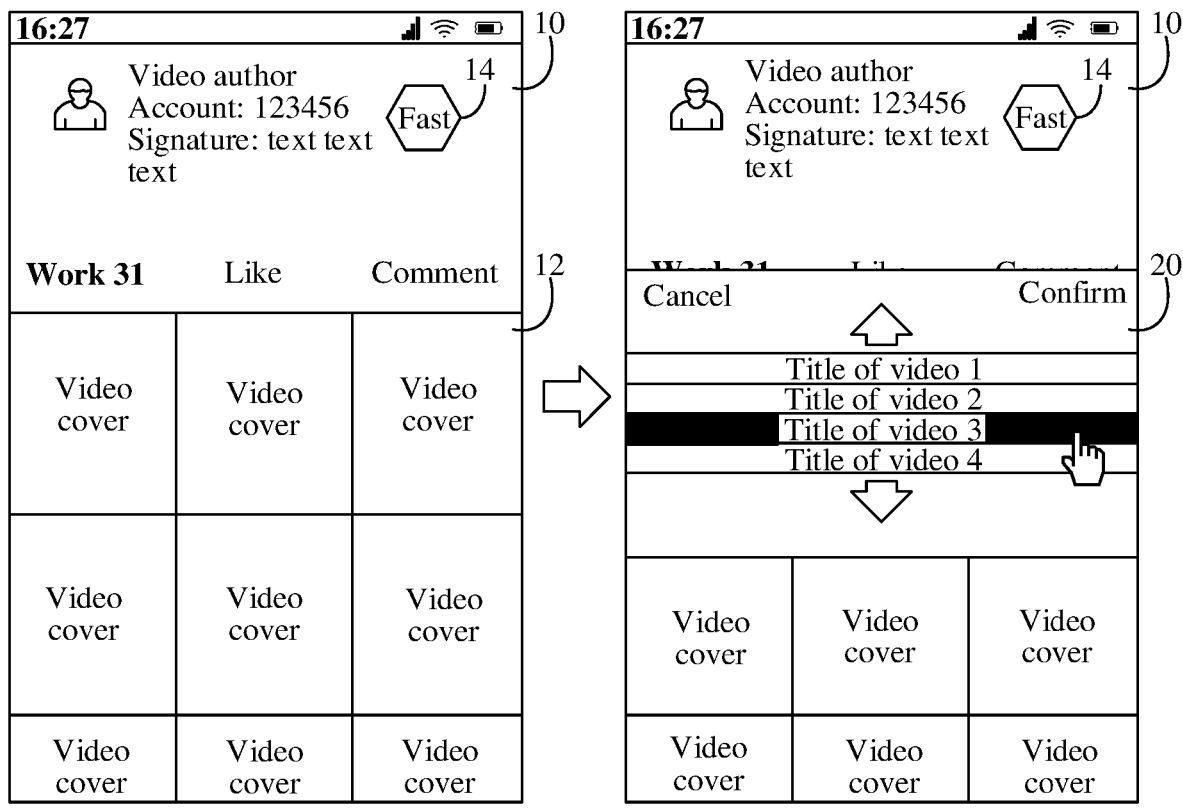
FIG. 1 is an interface diagram of a video searching method provided by an exemplary embodiment of the present disclosure.

In embodiments of the present disclosure, provided is a technical solution for quickly searching for a video. As shown in FIG. 1, a video list page 10 of an author is displayed by a short video program. Video covers of a plurality of videos 12 are displayed on the video list page 10 using a grid list and the video covers can be video cover graphs already loaded or default cover icons when the video cover graphs have not been loaded. A fast find button 14 is also displayed on the video list page 10. A user may enter a fast find mode by a gesture for quickly entering a find mode or by taping the fast find button 14. In the fast find mode, the video list page 10 is displayed with a picker viewer 20 on which name options of a plurality of videos are displayed as a list. When the user taps on a target name of a certain video on the picker viewer 20, a target video corresponding to the target name option is displayed or played.

Figure 2:
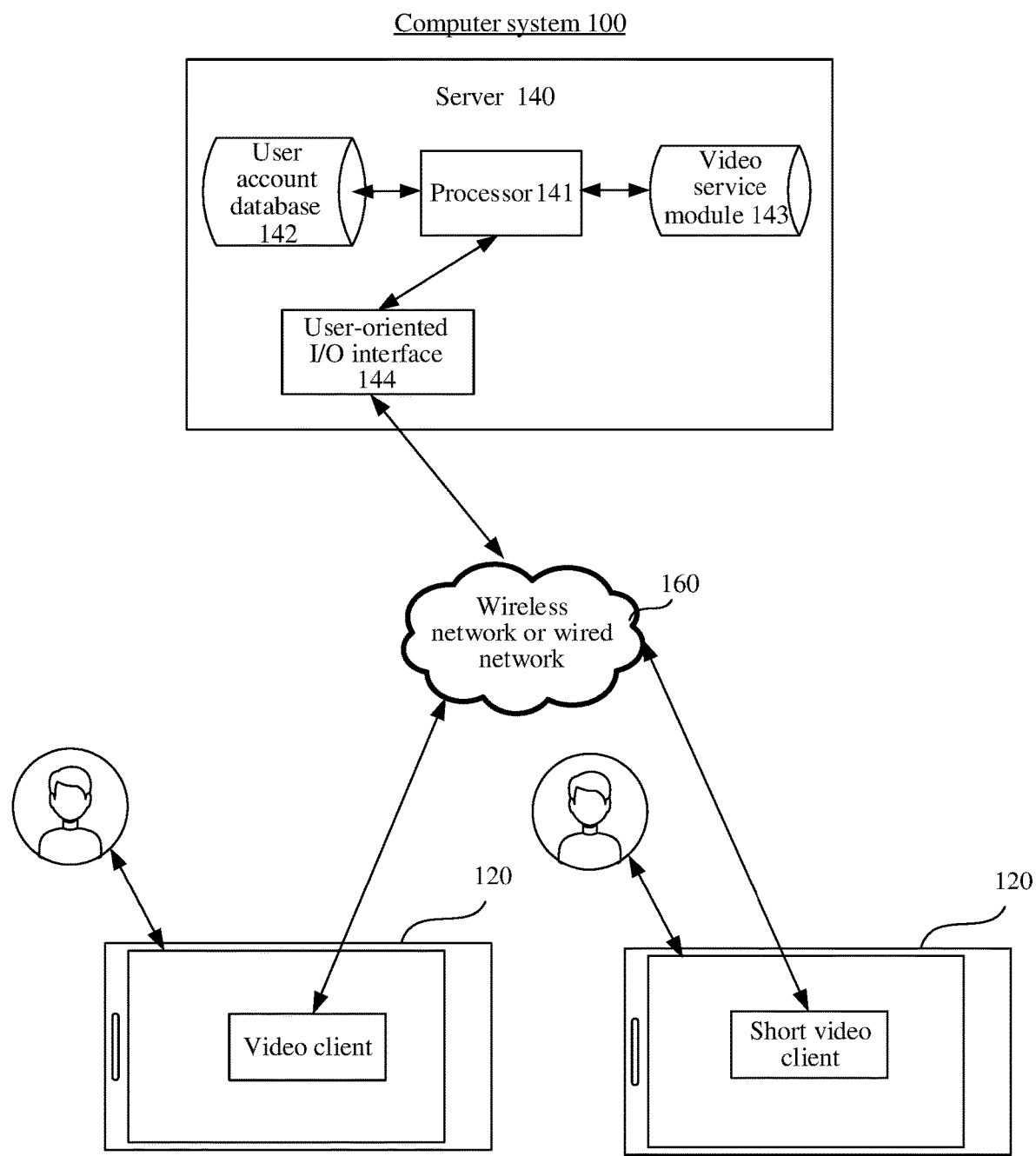
FIG. 2 is a block diagram of a computer system provided by an exemplary embodiment of the present disclosure.

FIG. 2 is a block diagram of a computer system 100 provided by an exemplary embodiment of the present disclosure, and the computer system 100 includes: a terminal 120 and a server 140.

A client is installed and runs on the terminal 120, and the client may be an application or a web page program that supports short video play and/or video play. The client may include a short video client, a video client, a social client with a video playing function, a shopping client with a video playing function, and the like. A user account is registered on the terminal 120. In some embodiments, device types of the terminal 120 include: at least one of a smart phone, a tablet computer, an e-book reader, an MP3 player, an MP4 player, a smart television, a smart car terminal, a laptop portable computer, and a desktop computer. The following embodiments are illustrated by the example that the terminal 120 includes a smart phone.

A person skilled in the art will appreciate that the number of the above terminals 120 may be greater or fewer. For example, there may be only one terminal 120, dozens or hundreds of the terminals 120, or more. The embodiments of the present disclosure do not limit the number and the device types of the terminal 120.

The terminal 120 is connected to the server 140 through a wireless network or a wired network 160.

The server 140 includes at least one of a server, a plurality of servers, a cloud computing platform, and a virtualization center. The server 140 corresponds to the client and is configured to provide background services for the client. In some embodiments, the server 140 undertakes primary computing work and the terminal 120 undertakes secondary computing work; or the server 140 undertakes the secondary computing work and the terminal 120 undertakes the primary computing work; or a distributed computing architecture is used for coordinated computation between the server 140 and the terminal 120.

In some embodiments, the terminal 120 and the server 140 are both computer devices.

In one illustrative example, the server 140 includes a processor 141, a user account database 142, a video service module 143, and a user-oriented input/output (I/O) interface 144. The processor 141 is configured to load instructions stored in the server 140 and process data in the user account database 142 and the video service module 143. The user account database 142 is used for storing data of user accounts used by the terminal 120 and other terminals, such as a profile photo of the user account, a nickname of the user account, a signature of the user account, and a service area where the user account is located. The video service module 143 is configured to provide a query service and a playing service for a plurality of videos. The user-oriented I/O interface 144 is configured to establish communication and exchange data with the terminal 120 through the wireless network or the wired network.

Figure 3:
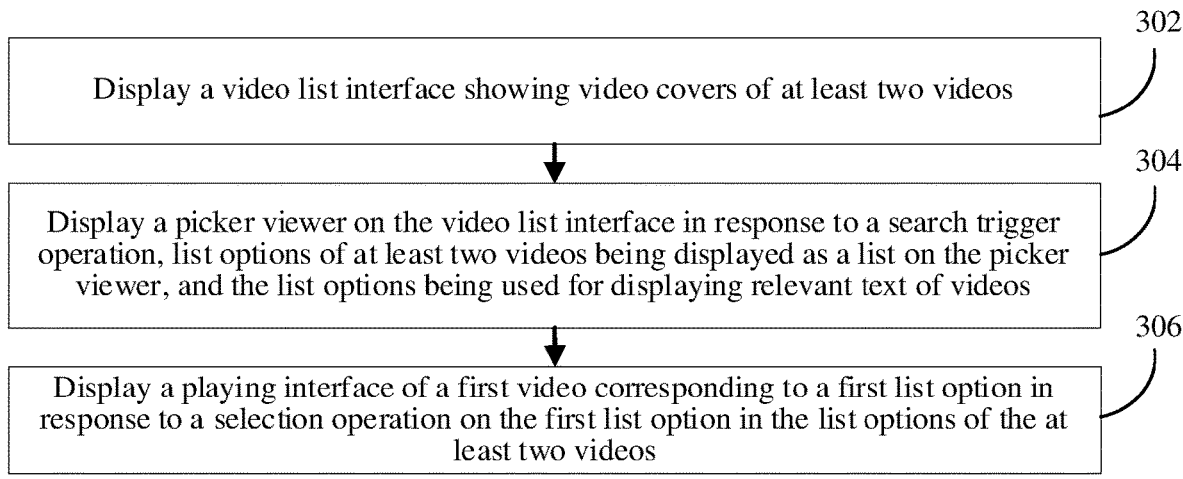
FIG. 3 is a flowchart of a video searching method provided by an exemplary embodiment of the present disclosure.

FIG. 3 is a flowchart of a video searching method provided by an exemplary embodiment of the present disclosure. The method is performed by a terminal. The method includes the following steps:

Step 302: Display a Video List Interface Showing Video Covers of at Least Two Videos.

A user interface used for displaying a video cover (or thumbnail) of one or more videos is on the video list interface. The video cover includes at least one of a preset graph, a frame of an image frame in a video, an episode poster, a profile photo of an author, and a video preview clip.

In some embodiments, when the video cover has been loaded, the video cover may be a cover graph; when the video cover has not been loaded, the video cover may be a default cover icon.

In some embodiments, the video cover of one or more videos is displayed using a grid list. For example, the grid list is a multi-line list in which a plurality of videos are sequentially arranged from top to bottom and from left to right with 3 videos per line as a fixed line width.

In some embodiments, the video list interface is used for displaying the video covers of a plurality of videos of the same user account; or the video list interface is used for displaying the video covers of a plurality of videos of the same author; or the video list interface is used for displaying the video covers of a plurality of videos of the same favorite or column; or the video list interface is used for displaying the video covers of a plurality of videos of the same episode or collection of episodes.

Typically, relevant text of the videos is not displayed on the grid list. The relevant text of the videos includes a title of the video, content introduction of the video, an episodic sequence number of the video, and the like.

Step 304: Display the Picker Viewer on the Video List Interface in Response to a Search Trigger Operation, List Options of at Least Two Videos being Displayed as a List on the Picker Viewer, and the List Options being Used for Displaying Relevant Text of Videos Corresponding to the List Options.

The search trigger operation is used for triggering and displaying the picker viewer. The search trigger operation includes, but is not limited to: any one or at least one of a tap operation, a double-tap operation, a slide operation, a gesture operation, a pressure touch operation, an edge touch operation, a sensor operation, a physical button operation, an eye movement control operation, and the like.

The terminal displays the picker viewer on the video list interface in response to the search trigger operation. The picker viewer is a control in a list form. One example of the picker viewer is a scroll selector. The picker viewer may show a spinning wheel or slot machine to display one or more set of values so that the user can spin the wheel to select one. Multiple-line list options are displayed within the picker viewer and each list option corresponds to a video. Illustratively, list options of at least two videos are displayed as a list on the picker viewer. The at least two videos in the picker viewer (including a hidden display portion) belong to the at least two videos displayed on the video list interface.

In some embodiments, a width of each list option is equal to or less than a width of the video list interface.

Illustratively, the terminal displays the picker viewer on a visual focus region of the video list interface in response to the search trigger operation. The visual focus region is the region where the user focuses on the video list interface. The visual focus region may be set using empirical values or dynamically determined based on that a camera captures sight lines of the user. Typically, the visual focus region is a local region on the video list interface. However, on some small-screen terminals, it is not excluded that the visual focus region is all regions on the video list interface.

Illustratively, the visual focus region is a middle region, a lower region, or an upper region of the video list interface, which is exemplified in this embodiment as a middle region.

Illustratively, the picker viewer is overlaid on the visual focus region, or the picker viewer replaces the original display on the visual focus region. In some embodiments, when the visual focus region occupies the entire video list interface, the video list interface is replaced with the picker viewer.

The relevant text of the corresponding video is displayed on each list option. The relevant text of the video includes: at least one of a name or title of the video, a content profile of the video, an episode number of the video, a video tag, an interactive record, and a wonderful comment. Illustratively, when the video is an independent video in a non-episodic form, the relevant text of the video includes at least one of a name of the video, a title of the video, a content profile of the video, and a video tag. When the video is an episode of video in an episode form, the relevant text of the video includes a sequence number of the video.

Illustratively, due to a limited height of the picker viewer, only a few list options can be displayed at one time, and the remaining list options in a hidden display state are required to be displayed in a scrolling manner.

Illustratively, there is a first list option in a (default) selected state in the picker viewer. The first list option in a selected state is in a middle portion, an upper portion, or a lower portion of the picker viewer. The first list option in the selected state is highlighted. A method of highlighting includes, but is not limited to: at least one of bold font, reverse color display, changing a background color, changing a background graph, changing a foreground graph, increasing animation effect, and increasing horizontal scrolling effect. The method of highlighting is not limited by the present disclosure, as long as the first list option in the selected state can be distinguished from other list options.

Illustratively, as shown in FIG. 1, the terminal displays the picker viewer 20 on the video list interface. Relevant text of a plurality of videos is displayed on the picker viewer 20, and the relevant text of a plurality of videos includes: a title of video 1, a title of video 2, a title of video 3, and a title of video 4. The user may slide on the picker viewer 20 to scroll through different list options. The list option located in the third row is in the default selected state. For example, video 3 in FIG. 1 is in the default selected state.

Step 306: Display a Playing Interface of a First Video Corresponding to a First List Option in Response to a Selection Operation on the First List Option in the List Options of the at Least Two Videos.

The selection operation is used for selecting the first list option in the list options of the at least two videos. The selection operation includes, but is not limited to: any one or at least one of a tap operation, a double-tap operation, a slide operation, a gesture operation, a pressure touch operation, an edge touch operation, a sensor operation, a physical button operation, an eye movement control operation, and the like.

After the first list option is selected, the terminal displays the playing interface of the first video corresponding to the first list option.

In summary, in the method provided by the present embodiment, text contents of the at least two videos are displayed on corresponding list options by displaying the picker viewer on the video list interface, so that users can select target videos according to the text content of each video, thereby solving the problem that users fail to find target videos quickly and accurately on the video list interface and facilitating users to quickly find videos desired to be viewed using the text content of each video when video covers on the video list interface are default icons or do not carry sufficient effective information.

Figure 4:
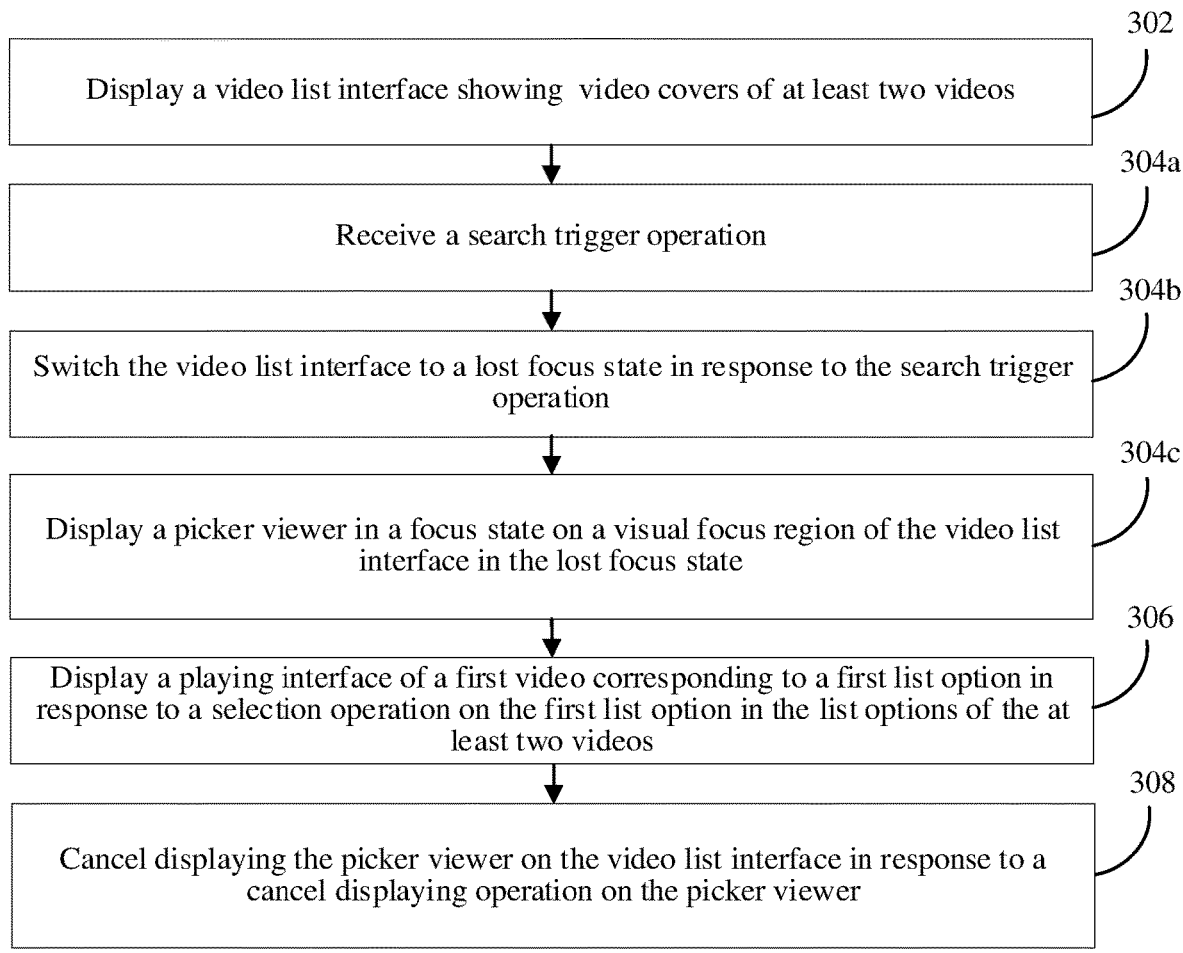
FIG. 4 is a flowchart of a video searching method provided by an exemplary embodiment of the present disclosure.

FIG. 4 is a flowchart of a video searching method provided by an exemplary embodiment of the present disclosure. The method is performed by a terminal. The method includes the following steps:

Step 302: Display a Video List Interface Showing Video Covers of at Least Two Videos.

Detailed description of this step can refer to step 302 in FIG. 3 and will not be repeated here.

Step 304a: Receive a Search Trigger Operation.

The search trigger operation is used for triggering and displaying the picker viewer. The search trigger operation includes, but is not limited to: any one or at least one of a tap operation, a double-tap operation, a slide operation, a gesture operation, a pressure touch operation, an edge touch operation, a sensor operation, an eye movement control operation, and the like.

This step includes at least one of the following two implementations.

1. It is determined that the search trigger operation is received in response to receiving a gesture operation conforming to a first gesture.

The first gesture is a system-preset gesture or a user-defined gesture. A specific gesture form of the first gesture is not limited.

Illustratively, on the video list interface, the first gesture is a gesture that the user quickly slides the video list twice in succession. An absolute value of a sliding speed of the two slides is greater than or equal to 0.8 (the sliding speed has a value range of [−1, 1]), and a time interval between the two slides is less than 200 ms.

2. It is determined that the search trigger operation is received in response to receiving a trigger operation on a first control on the video list interface, and the first control is configured to trigger and display the picker viewer.

Illustratively, the first control, such as a "Fast" button 14 shown in FIG. 1, is displayed on the video list interface. It is determined that the search trigger operation is received in response to a one-tap operation or a double-tap operation on the first control.

In some embodiments, when the number of videos in the video list interface does not exceed a number threshold, the first control is not displayed on the video list interface; when the number of videos in the video list interface exceeds the number threshold, the first control is displayed on the video list interface. For example, the number threshold is 50.

Step 304b: Switch the Video List Interface to a Lost Focus State in Response to the Search Trigger Operation.

The lost focus state refers to a state in which the video list interface no longer responds to (all or most of) human-computer interactions. In one embodiment, after displaying an animation for a predetermined duration, the terminal switches the video list interface into a ground glass display state. The ground glass display state is used for indicating that the video list interface is switched into the lost focus state and no longer responds to the human-computer interactions by the user.

Step 304c: Display the Picker Viewer in a Focus State on the Visual Focus Region of the Video List Interface in the Lost Focus State.

The terminal displays the picker viewer on the video list interface in the lost focus state, list options of at least two videos are displayed as a list, and the list options are used for displaying relevant text of videos corresponding to the list options. The terminal displays the picker viewer on the visual focus region of the video list interface in response to the trigger operation. The visual focus region is the region where the user focuses on the video list interface. The visual focus region may be set using empirical values or dynamically determined based on that a camera captures sight lines of the user. Typically, the visual focus region is a local region on the video list interface. However, on some small-screen terminals, it is not excluded that the visual focus region is all regions on the video list interface.

Illustratively, the visual focus region is a middle region, a lower region, or an upper region of the video list interface, which is exemplified in this embodiment as a middle region.

The picker viewer is in a focus state (or a focus capturing state), and the focus state refers to a state in which the picker viewer has a capability of responding to the human-computer interactions, or the picker viewer can respond to the human-computer interactions. Illustratively, when a touch event is on a touch screen, an operating system transmits the touch event to the picker viewer in the focus state for response.

The picker viewer is a control in a list form. Multiple-line list options are displayed within the picker viewer and each list option corresponds to a video. Illustratively, list options of at least two videos are displayed as a list on the picker viewer. The at least two videos in the picker viewer (including a hidden display portion) belong to the at least two videos displayed on the video list interface.

Relevant text of the corresponding video is displayed on each list option. The relevant text of the video includes: at least one of a name or title of the video, a content profile of the video, an episode number of the video, a video tag, an interactive record, and a wonderful comment. Illustratively, when the video is an independent video in a non-episodic form, the relevant text of the video includes at least one of a name of the video, a title of the video, a content profile of the video, and a video tag. When the video is an episode of video in an episode form, the relevant text of the video includes a sequence number of the video.

Illustratively, due to a limited height of the picker viewer, only a few list options can be displayed at one time, and the remaining list options in a hidden display state are required to be displayed in a scrolling manner.

The terminal displays a list option located at a preset option position on the picker viewer as a first list option in a default selected state; or displays the list option located at the preset option position on the picker viewer during scrolling as the first list option in the selected state in response to a scrolling operation on the picker viewer. Illustratively, the preset option position is in a middle portion, an upper portion, or a lower portion of the picker viewer. The first list option in the selected state is highlighted. A method of highlighting includes, but is not limited to: at least one of bold font, reverse color display, changing a background color, changing a background graph, changing a foreground graph, increasing animation effect, and increasing horizontal scrolling effect. The method of highlighting is not limited by the present disclosure, as long as the first list option in the selected state can be distinguished from other list options.

Illustratively, as shown in FIG. 1, the terminal displays the picker viewer 20 on the video list interface. Relevant text of a plurality of videos is displayed on the picker viewer 20, and the relevant text of a plurality of videos includes: a title of video 1, a title of video 2, a title of video 3, and a title of video 4. The user may slide on the picker viewer 20 to scroll through different list options. The list option located in the third row is in the default selected state. For example, video 3 in FIG. 1 is in the default selected state.

Step 306: Display a Playing Interface of a First Video Corresponding to a First List Option in Response to a Selection Operation on the First List Option in the List Options of the at Least Two Videos.

In some embodiments, a list option located at a preset option position on the picker viewer is displayed as a first list option in a default selected state; or the list option located at the preset option position on the picker viewer during scrolling is displayed as the first list option in the selected state in response to a scrolling operation on the picker viewer. Illustratively, the preset option position is a list option located at a central position among a plurality of list options in the picker viewer, or a list option in an $i^{th}$ position.

When the first list option is in the selected state, the playing interface of the first video corresponding to the first list option is displayed in response to a trigger operation of a confirmation control on the picker viewer, for example, the trigger operation is a tap operation; or when the first list option is in the selected state, the playing interface of the first video corresponding to the first list option is displayed in response to a trigger operation triggered on the first list option. For example, the trigger operation triggered on the first list option is a double-tap operation, a slide operation, and the like.

Step 308: Cancel Displaying the Picker Viewer on the Video List Interface in Response to a Cancel Displaying Operation on the Picker Viewer.

The cancel displaying operation is a human-computer interaction for triggering the cancel displaying of the picker viewer. The cancel displaying operation includes but is not limited to: any one or at least one of a tap operation, a double-tap operation, a slide operation, a gesture operation, a pressure touch operation, an edge touch operation, a sensor operation, a physical button operation, an eye movement control operation, and the like.

Illustratively, a cancel control is also displayed on the picker viewer and the cancel displaying operation is an operation of taping the cancel control. Or the cancel displaying operation is an operation of taping a blank region other than the picker viewer, and the blank region may be a region on the video list interface in the lost focus state.

Illustratively, in response to the cancel displaying operation on the picker viewer, the picker viewer is canceled displaying on the video list interface and the video list interface is switched from the lost focus state to a focus acquisition state. After switching to the focus acquisition state, the user can resume a normal interaction on the video list interface.

In summary, in the method provided by the present embodiment, text contents of the at least two videos are displayed on corresponding list options by displaying the picker viewer on the video list interface, so that users can select target videos according to the text content of each video, thereby solving the problem that users fail to find target videos quickly and accurately on the video list interface and facilitating users to quickly find videos desired to be viewed using the text content of each video when video covers on the video list interface are default icons or do not carry sufficient effective information.

Figure 5:
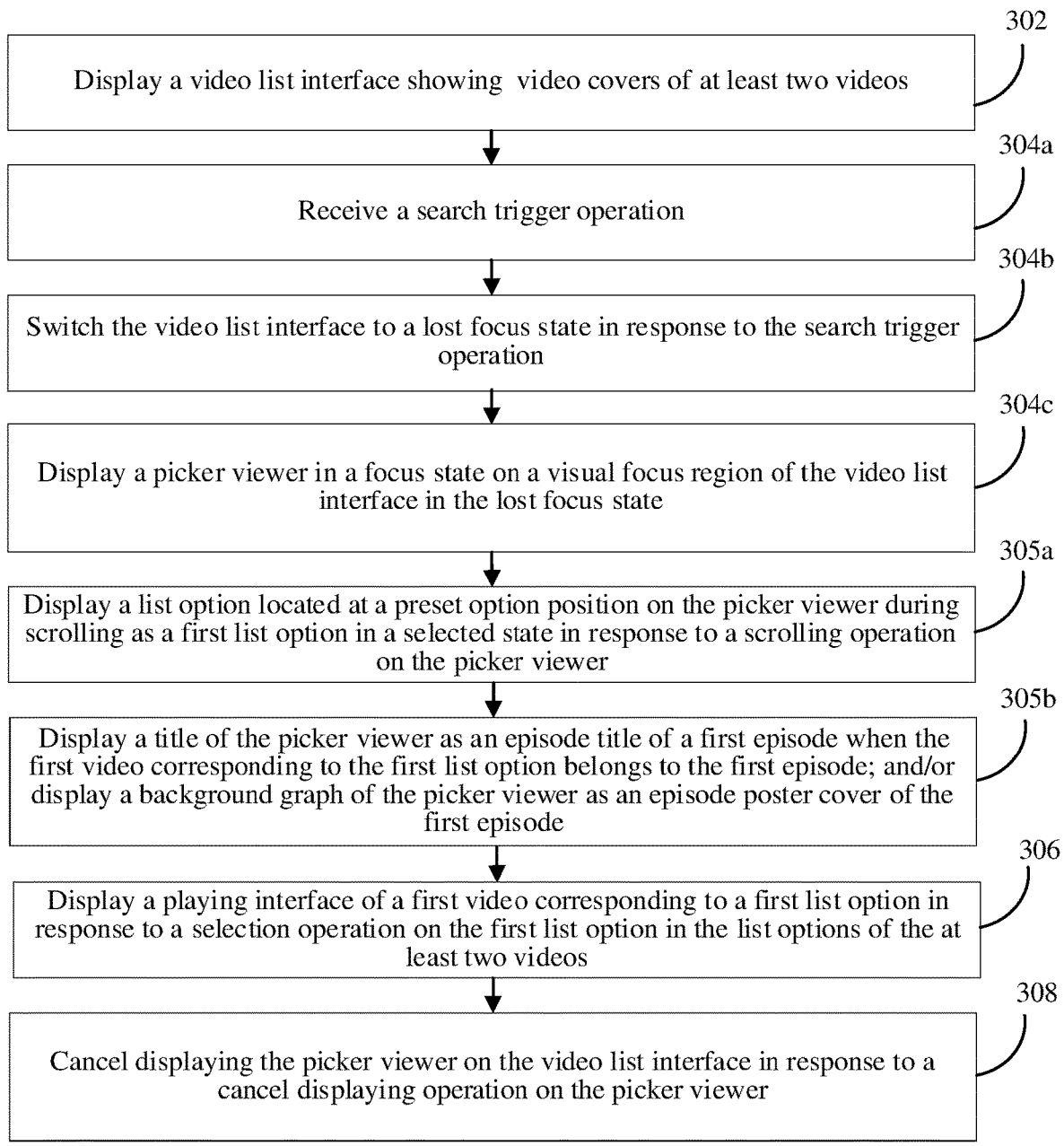
FIG. 5 is a flowchart of a video searching method provided by an exemplary embodiment of the present disclosure.

In some embodiments, the at least two videos include an episodic video. The episodic video is a collection of videos that includes different episodes with related content. For example, a collection of 40-episode television series or a collection of 60-episode short videos. Based on the embodiment shown in FIG. 4, the method further includes the following steps 305a to 305b, as shown in FIG. 5:

Step 305a: Display a List Option Located at a Preset Option Position on the Picker Viewer During Scrolling as a First List Option in a Selected State in Response to a Scrolling Operation on the Picker Viewer.

The terminal displays a list option located at a preset option position on the picker viewer as a first list option in a default selected state; or displays the list option located at the preset option position on the picker viewer during scrolling as the first list option in the selected state in response to a scrolling operation on the picker viewer.

Illustratively, the preset option position is in the middle of the picker viewer. The first list option in the selected state is highlighted. A method of highlighting includes, but is not limited to: at least one of bold font, reverse color display, changing a background color, changing a background graph, changing a foreground graph, increasing animation effect, and increasing horizontal scrolling effect. The method of highlighting is not limited by the present disclosure, as long as the first list option in the selected state can be distinguished from other list options.

Step 305b: Display a Title of the Picker Viewer as an Episode Title of a First Episode when the First Video Corresponding to the First List Option Belongs to the First Episode; and/or Display a Background Graph of the Picker Viewer as an Episode Poster Cover of the First Episode.

The first list option is a list option in the selected state in the at least two videos.

The episode title is a video title that is common to a plurality of videos of the same episode. For example, "Emperor Legend", "xx Adventures", "Ups and Downs in the Sea of x", and the like. The episode poster cover is a video poster that is common to a plurality of videos of the same episode.

Figure 6:
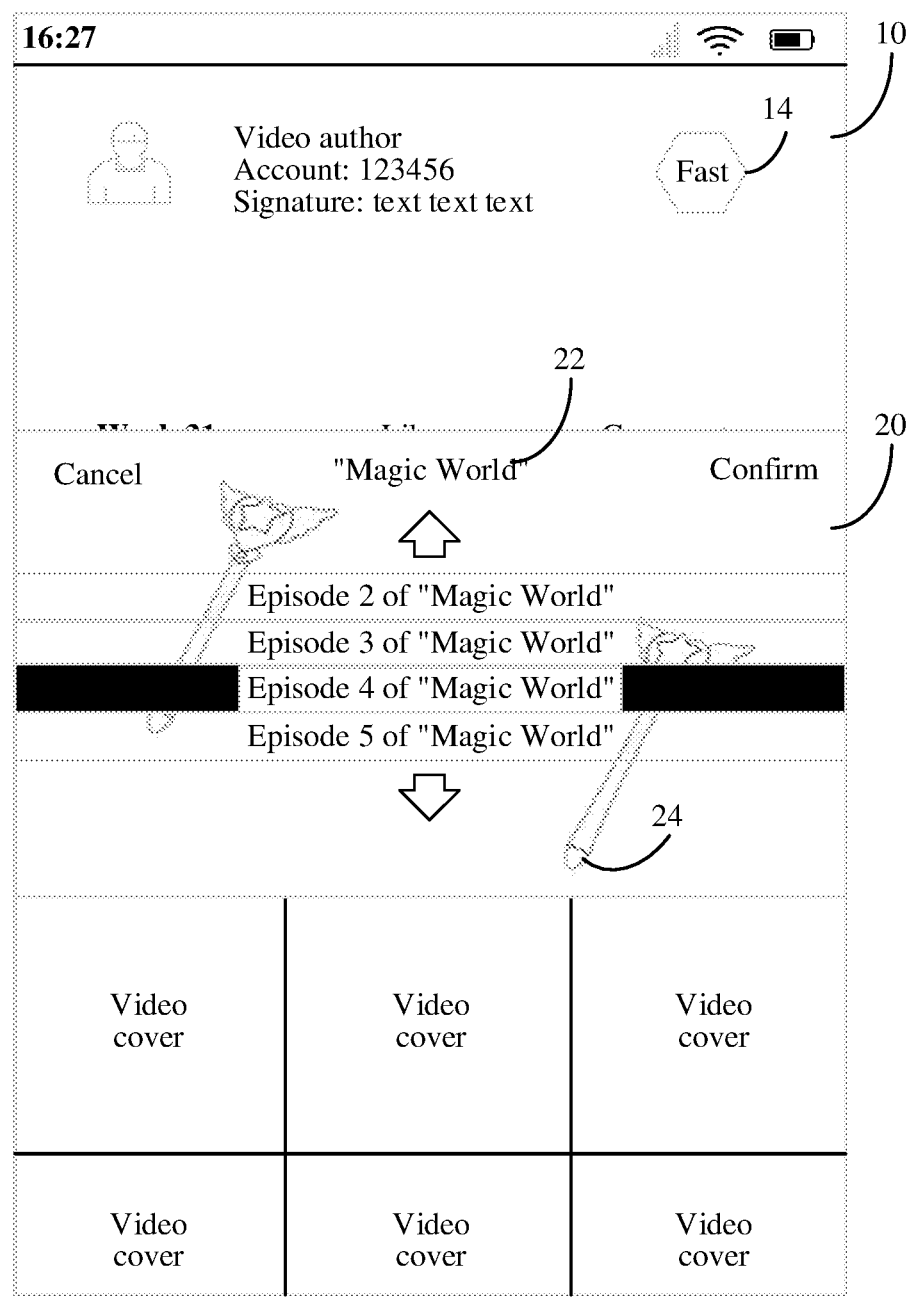
FIG. 6 is an interface diagram of a video searching method provided by an exemplary embodiment of the present disclosure.

As shown in FIG. 6, when the first video "episode 4 of Magic World" corresponding to the first list option belongs to the first episode "Magic World", the title 22 of the picker viewer is displayed as "Magic World"; and/or, the background graph 24 of the picker viewer is displayed as the episode poster cover of "Magic World".

For episodic videos, the episode name is automatically displayed on the title of the picker viewer and the background graph of the picker viewer is automatically set as the episode poster cover. Therefore, it is convenient for the user to intuitively visualize the episode information currently being searched for. If a scroll wheel automatically shows the content of the next group of episodic videos after the user slides over a group of episodic videos, the title and background graph of the picker viewer are automatically switched to the information about the next group of episodic videos.

In summary, in the method provided by this embodiment, the user can intuitively visualize the episode information currently being searched for by displaying the title and background graph of the picker viewer as video information related to episodic videos when the currently selected video belongs to the episodic videos.

Figure 7:
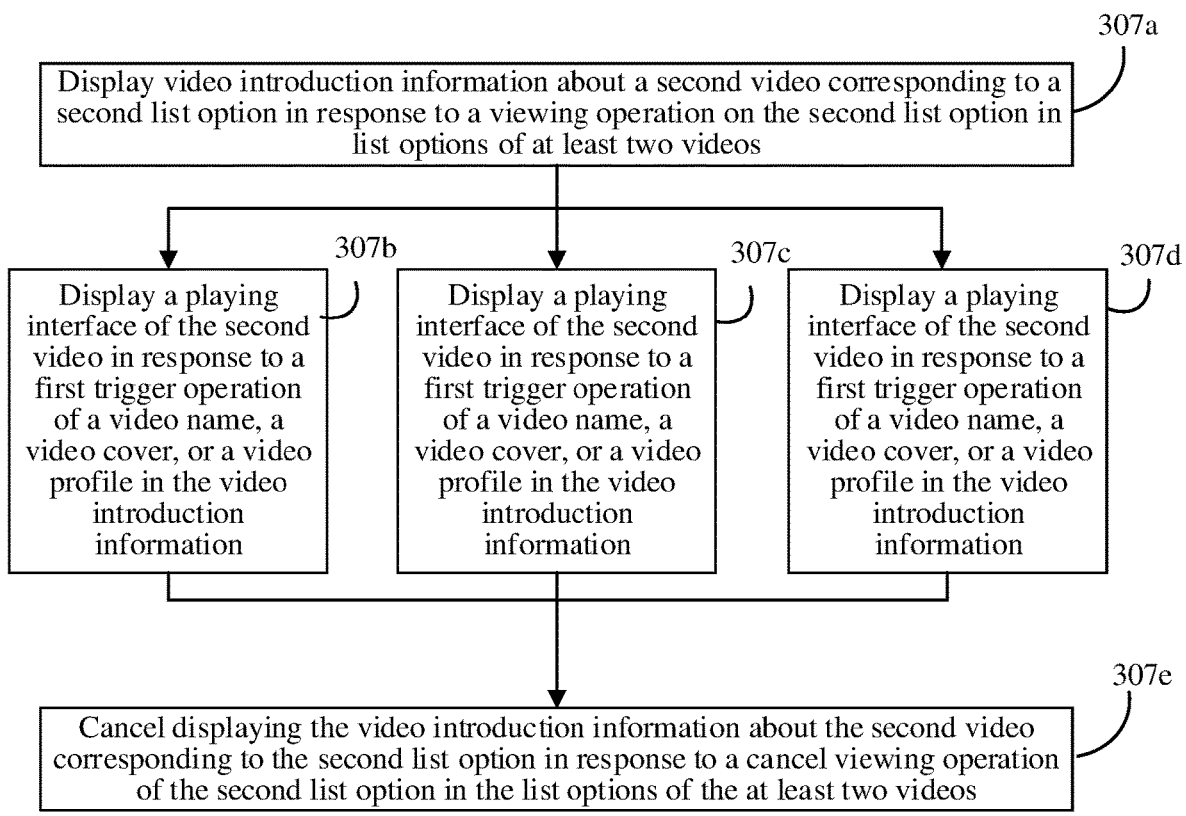
FIG. 7 is a flowchart of a video searching method provided by an exemplary embodiment of the present disclosure.

In some embodiments, during selection of a list option in the picker viewer, each list option can display a limited text content. Based on the embodiment shown in FIG. 3, FIG. 4, or FIG. 5, the above method may further include the following step 307a to step 307e, as shown in FIG. 7:

Step 307a: Display Video Introduction Information about a Second Video Corresponding to a Second List Option in Response to a Viewing Operation on the Second List Option in the List Options of the at Least Two Videos.

The viewing operation is a human-computer interaction for triggering the viewing of the video introduction information about the second video. The viewing operation includes but is not limited to: any one or at least one of a tap operation, a double-tap operation, a slide operation, a gesture operation, a pressure touch operation, an edge touch operation, a sensor operation, a physical button operation, an eye movement control operation, and the like.

In this embodiment, it is illustrated by the example that the viewing operation is a left-slide operation on the second list option. Illustratively, the second list option is any one of the at least two list options. The video introduction information about the second video corresponding to the second list option is displayed in response to the left-slide operation on the second list option.

Illustratively, a prompt box pops up above or below the picker viewer and the video introduction information about the second video corresponding to the second list option is displayed in the prompt box.

The video introduction information includes: at least one of a video name, a video cover, a video profile, background music information, geographical location information, number of plays, number of likes, and number of comments.

Figure 8:
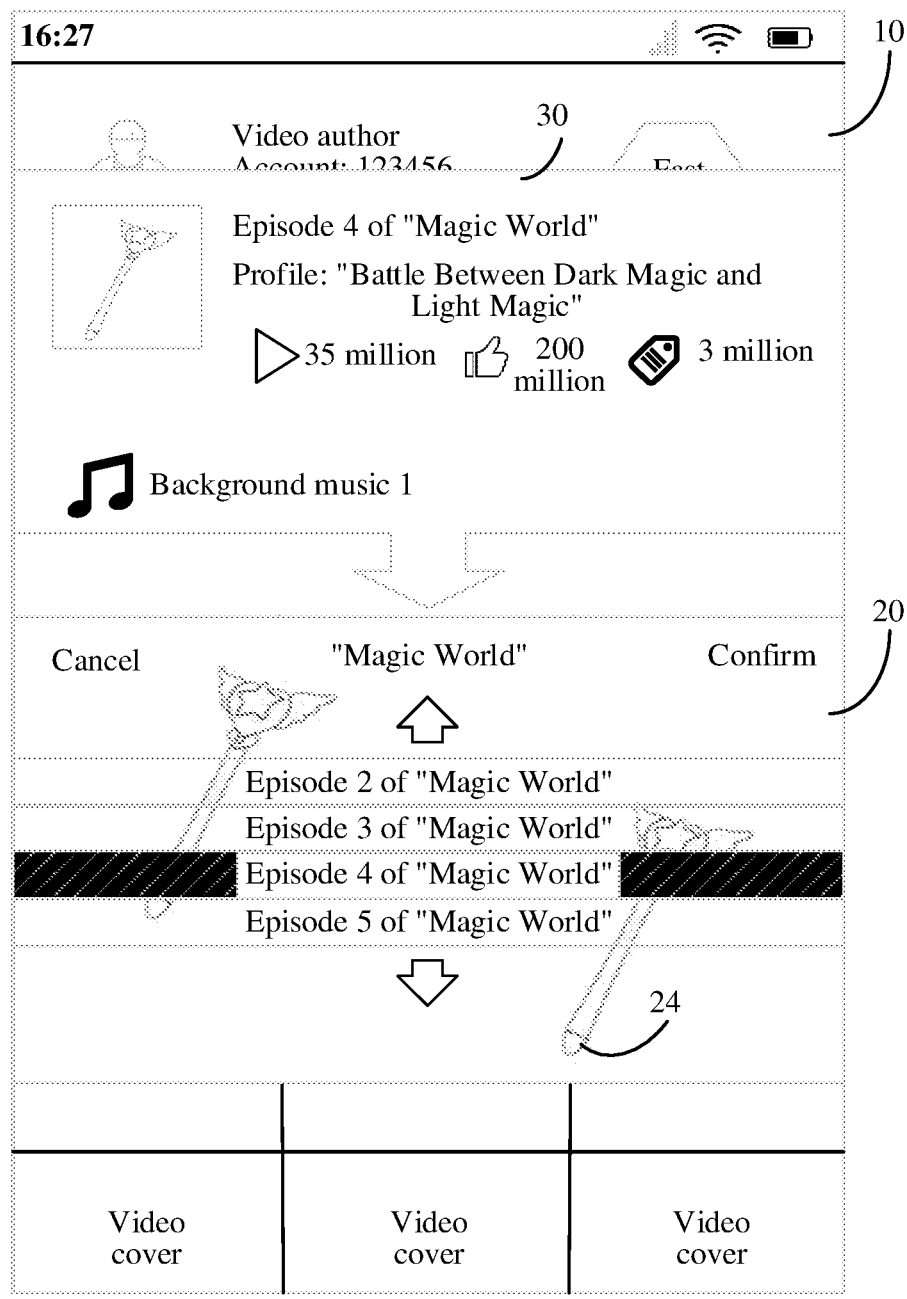
FIG. 8 is an interface diagram of a video searching method provided by an exemplary embodiment of the present disclosure.

Referring to FIG. 8, when the user slides left on the second list option "episode 4 of Magic World", a prompt box 30 pops up above the picker viewer 20, in which a video name "episode 4 of Magic World", a video cover, a video profile "Battle Between Dark Magic and Light Magic", background music information "Background Music 1", the number of plays "35 million", the number of likes "200 million", and the number of comments "3 million" are displayed.

Step 307b: Display a Playing Interface of the Second Video in Response to a First Trigger Operation of the Video Name, the Video Cover, or the Video Profile in the Video Introduction Information.

Illustratively, the first trigger operation is a tap operation on the video name, the video cover, or the video profile.

Step 307c: Display a Video List Interface of the Same Background Music Indicated by the Background Music Information in Response to a Second Trigger Operation of the Background Music Information in the Video Introduction Information.

Illustratively, the second trigger operation is a tap operation on the background music information. The video list interface of the same background music indicated by the background music information is displayed in response to the tap operation on the background music information. A plurality of videos using the same background music are displayed on the video list interface. The plurality of videos using the same background music may be videos by the same author or videos by different authors.

Step 307d: Display a Video List Interface of the Same Geographical Location Indicated by the Geographical Location Information in Response to a Third Trigger Operation of a Geographical Location Tag in the Video Introduction Information.

Illustratively, the third trigger operation is a tap operation on the geographical location tag. The video list interface of the same background music indicated by the geographical location tag is displayed in response to the tap operation on the geographical location tag. A plurality of videos using the same geographical location are displayed on the video list interface. The plurality of videos using the same geographical location may be videos by the same author or videos by different authors.

Step 307*e*: Cancel Displaying the Video Introduction Information about the Second Video Corresponding to the Second List Option in Response to a Cancel Viewing Operation of the Second List Option in the List Options of the at Least Two Videos.

The cancel viewing operation is a human-computer interaction for triggering the cancel displaying of the video introduction information about the second video. The cancel viewing operation includes, but is not limited to: any one or at least one of a tap operation, a double-tap operation, a slide operation, a gesture operation, a pressure touch operation, an edge touch operation, a sensor operation, a physical button operation, an eye movement control operation, and the like.

In this embodiment, it is illustrated by the example that the cancel viewing operation is a right-slide operation on the second list option. Illustratively, the second list option is any one of the at least two list options. The video introduction information about the second video is canceled displaying in response to the right-slide operation on the second list option. Illustratively, the prompt box is canceled displaying above or below the picker viewer in response to the right-slide operation on the second list option.

Illustratively, the cancel viewing operation is a tap operation on a blank region other than the picker viewer and the prompt box, i.e., the prompt box is canceled displaying when the user taps on the blank region other than the picker viewer and the prompt box.

In summary, in the method provided by this embodiment, the video introduction information is displayed by providing an additional pop-up for a candidate list option in the picker viewer, so that the user can have a more intuitive and rich understanding of the video introduction information about the candidate list option. For example, a video name, a video cover, a video profile, background music information, geographical location information, number of plays, number of likes, and number of comments of the candidate list options can be directly displayed, thereby solving the problem that a display area of each list option in the picker viewer is limited and less effective information can be displayed.

In the method provided by this embodiment, the video list interface of the same background music indicated by the background music information is displayed in response to the second trigger operation of the background music information in the video introduction information. When the user is interested in certain background music, other videos with the same background music can be quickly viewed. As a result, the human-computer interaction efficiency of the user viewing other videos with the same background music is improved, and the videos can be queried in one step without multiple interactions.

In the method provided by this embodiment, the video list interface of the same geographical location indicated by the geographical location information is displayed in response to the third trigger operation of the geographical location tag in the video introduction information. When the user is interested in certain geographical location, other videos with the same geographical location can be quickly viewed. As a result, the human-computer interaction efficiency of the user viewing other videos with the same geographical location is improved, and the videos can be queried in one step without multiple interactions.

Figure 9:
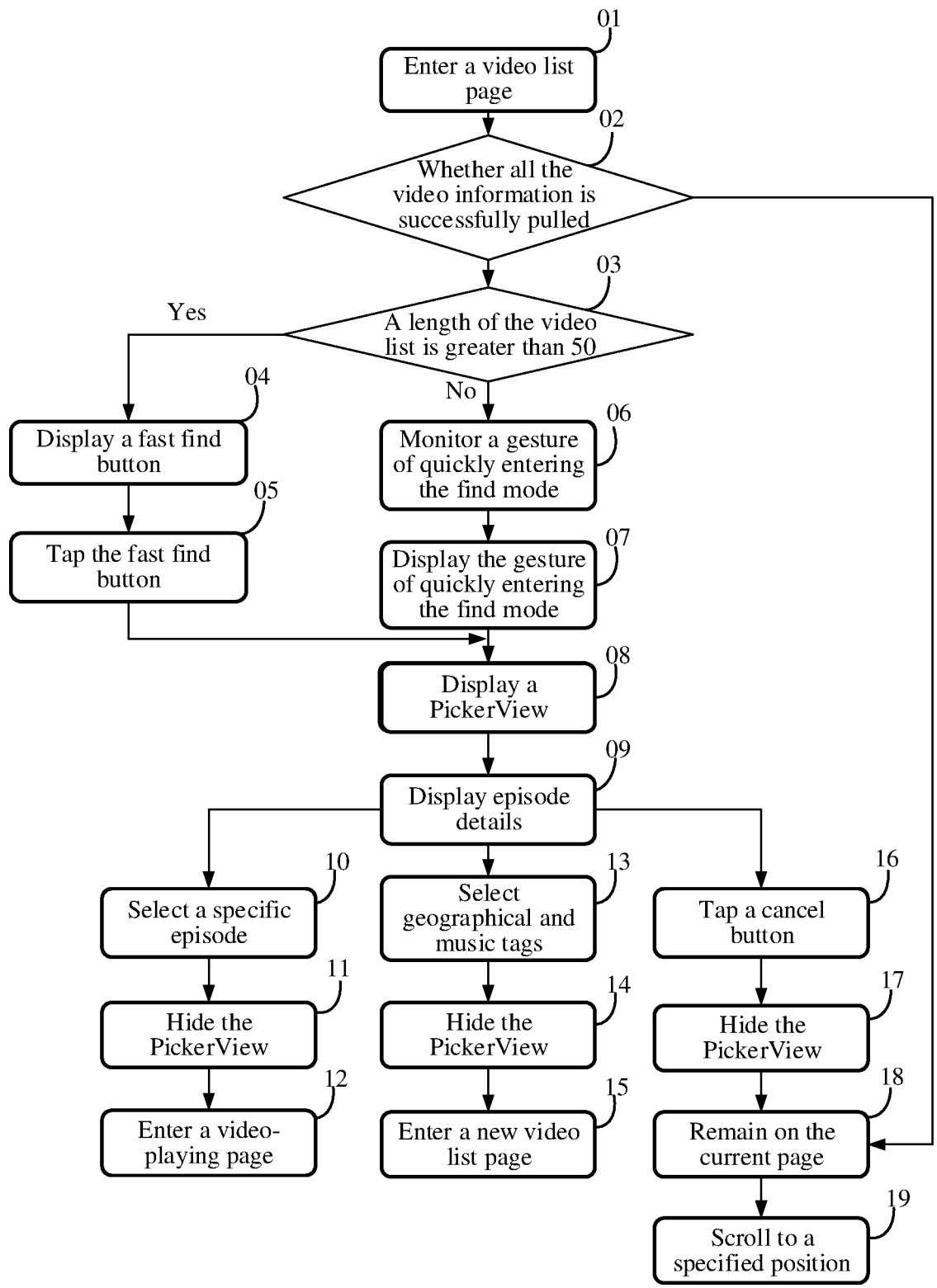
FIG. 9 is a flowchart of a video searching method provided by an exemplary embodiment of the present disclosure.

FIG. 9 is a flowchart of a video searching method provided by an exemplary embodiment of the present disclosure. The method may be performed by a terminal. The method includes the following steps:

Step 01: Enter a video list page.

When entering the video list page, in addition to loading data of the current page, simple information about all videos is also required to be loaded via an application programming interface (API). The simple information about all videos includes: a name of the video and a playing link to the video.

If the video belongs to episodic videos, the simple information about all videos also includes: a name of the episode and a poster link to the episode.

Step 02: Whether all the video information is successfully pulled.

If all the video information is successfully pulled, then step 03 is executed; if all the video information is not successfully pulled, an entry into a fast find mode is not displayed and a gesture of the user entering the fast find mode is ignored.

Step 03: A length of the video list is greater than 50?

Determine whether the number of videos in the video list is greater than 50. If so, step 04 is executed; if not, step 06 is executed. The 50 is an exemplary threshold and may be changed to other numbers.

Step 04: Display a fast find button.

The fast find button is configured to enter a find mode quickly.

Step 05: Tap the fast find button.

If the user taps the fast find button, step 08 is executed.

Step 06: Monitor a gesture of quickly entering the find mode.

The terminal also automatically starts a gesture monitoring mode and each sliding gesture is acquired and monitored.

Step 07: Display the gesture of quickly entering the find mode.

When a sliding speed of the sliding gesture exceeds 0.8, current sliding time is recorded and whether there is a gesture time for quick sliding before is determined. If the gesture time for quick sliding is recorded, the time difference between the two gestures is compared; if the time difference is less than 200 ms, step 08 is executed.

If there is no gesture for quick sliding before, or a time interval between the two quick sliding gestures is less than 200 ms, it is determined not a gesture of the fast find mode, and the video list page is normally displayed. However, a time stamp at which the current gesture occurs is required to be recorded to compare the time difference between the two when the next quick sliding gesture occurs.

Step 08: Display a Picker View.

Step 09: Display episode details.

When the Picker View is displayed, if the user slides left, the prompt box is displayed, and the user taps a component on the prompt box. Upon completion of the jump, the original video list page automatically exits the fast find mode.

When the prompt box is displayed, the user cannot slide the scroll wheel up and down, and can only slide the currently selected item to the right and exit the prompt box, or tap a cancel button on the Picker View directly or the blank region of the page, so that the fast find mode can be directly exited.

If the user selects a specific episode in the episode details, then steps 10 to 12 are executed; if the user selects geographical and music tags in the episode details, then steps 13 to 15 are executed; and if the user taps the cancel button, then steps 16 to 19 are executed.

Step 10: Select a specific episode.
Step 11: Hide the Picker View.
Step 12: Enter a video-playing page.
Step 13: Select geographical and music tags.
Step 14: Hide the Picker View.
Step 15: Enter a new video list page.

When the prompt box is displayed, if the user taps the music tag or the geographical location tag, jump directly to a new video list page. The music or geographical location tag of the new video list page coincides with a tag of the original video.

The new video list page will also monitor the sliding gesture of the user. When the sliding gesture is a gesture of entering the find mode quickly, the fast find mode is also automatically entered.

Step 16: Tap a cancel button.
Step 17: Hide the Picker View.
Step 18: Remain on the current page.
Step 19: Scroll to a specified position.

When the cancel button or the blank region is taped to hide the Picker View, a video title (corresponding to the third video) currently in a selected state is required to be recorded, and after canceling displaying the Picker View, the video list page is automatically scrolled to a video position of the recorded third video.

After exiting the fast find mode, the terminal continues to monitor the sliding gesture of the user and re-enters the fast find mode as long as trigger conditions are satisfied.

Figure 10:
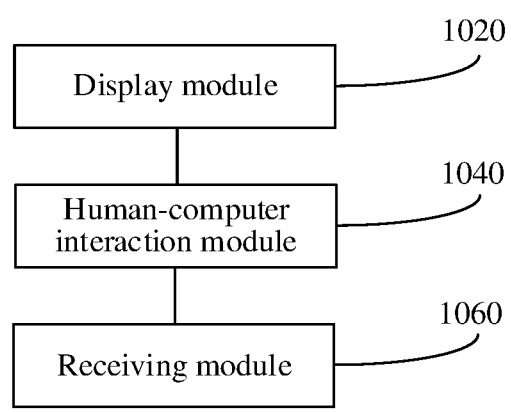
FIG. 10 is a structural block diagram of a video searching apparatus provided by another exemplary embodiment of the present disclosure.

FIG. 10 is a block diagram of a video searching apparatus provided by an exemplary embodiment of the present disclosure. The apparatus may be implemented as a terminal or part of a terminal by software, hardware, or a combination of both. The apparatus includes:
- a display module 1020, configured to display a video list interface showing video covers of at least two videos, and the video covers each including a cover graph or a cover icon;
- a human-computer interaction module 1040, configured to display a picker viewer on the video list interface in response to a search trigger operation, list options of the at least two videos being displayed on the picker viewer, and the list options being used for displaying relevant text of videos corresponding to the list options; and
- the human-computer interaction module 1040, configured to display a playing interface of a first video corresponding to a first list option in response to a selection operation on the first list option in the list options of the at least two videos.

In this embodiment, text contents of the at least two videos are displayed on corresponding list options by displaying the picker viewer on the video list interface, so that users can select target videos according to the text content of each video, thereby solving the problem that users fail to find target videos quickly and accurately on the video list interface and facilitating users to quickly find videos desired to be viewed using the text content of each video when video covers on the video list interface are default icons or do not carry sufficient effective information.

In one exemplary example of this embodiment, the human-computer interaction module 1040 is configured to display the picker viewer on a visual focus region of the video list interface in response to a search trigger operation.

In one exemplary example of this embodiment, the human-computer interaction module 1040 is configured to switch the video list interface to a lost focus state in response to the search trigger operation; display the picker viewer in a focus state on the visual focus region of the video list interface in the lost focus state.

In this embodiment, text contents of the at least two videos are displayed on corresponding list options by displaying the picker viewer on the visual focus region of the video list interface, so that users can select target videos according to the text content of each video, thereby solving the problem that users fail to find target videos quickly and accurately on the video list interface and facilitating users to quickly find videos desired to be viewed using the text content of each video when video covers on the video list interface are default icons or do not carry sufficient effective information.

In one exemplary example of this embodiment, the apparatus further includes:
- a receiving module 1060, configured to determine that the search trigger operation is received in response to receiving a gesture operation conforming to a first gesture; or determine that the search trigger operation is received in response to receiving a trigger operation on a first control on the video list interface, the first control being configured to trigger and display the picker viewer.

In one exemplary example of this embodiment, the apparatus further includes:
- a display module 1020, configured to display a list option located at a preset option position on the picker viewer as a first list option in a default selected state; or display the list option located at the preset option position on the picker viewer during scrolling as the first list option in the selected state in response to a scrolling operation on the picker viewer.

In one exemplary example of this embodiment, the human-computer interaction module 1040 is configured to display the playing interface of the first video corresponding to the first list option in response to a trigger operation of a confirmation control on the picker viewer;
or display the playing interface of the first video corresponding to the first list option in response to a trigger operation triggered on the first list option.

In one exemplary example of this embodiment, the display module 1020 is configured to display a title of the picker viewer as an episode title of a first episode when the first video corresponding to the first list option belongs to the first episode.

In one exemplary example of this embodiment, the display module 1020 is configured to display a background graph of the picker viewer as an episode poster cover of the first episode when the first video corresponding to the first list option belongs to the first episode.

In this embodiment, the user can intuitively visualize the episode information currently being searched for by displaying the title and background graph of the picker viewer as video information related to episodic videos when the currently selected video belongs to the episodic videos.

In one exemplary example of this embodiment, the human-computer interaction module 1040 is configured to display video introduction information about a second video corresponding to a second list option in response to a viewing operation on the second list option in the list options of the at least two videos, where the video introduction information includes: at least one of a video name, a video cover, a video profile, background music information, geographical location information, number of plays, number of likes, and number of comments.

In this embodiment, the user can have a more intuitive and rich understanding of the video introduction information about a candidate list option by providing additional video introduction information for the candidate list option in the picker viewer. For example, a video name, a video cover, a video profile, background music information, geographical location information, number of plays, number of likes, and number of comments of the candidate list options can be directly displayed, thereby solving the problem that a display area of each list option in the picker viewer is limited and less effective information can be displayed.

In one exemplary example of this embodiment, the human-computer interaction module 1040 is configured to execute at least one of the following steps.

A playing interface of the second video is displayed in response to a first trigger operation of the video name, the video cover, or the video profile in the video introduction information.

A video list interface of the same background music indicated by the background music information is displayed in response to a second trigger operation of the background music information in the video introduction information.

In this embodiment, the video list interface of the same background music indicated by the background music information is displayed in response to the second trigger operation of the background music information in the video introduction information. When the user is interested in certain background music, other videos with the same background music can be quickly viewed. As a result, the human-computer interaction efficiency of the user viewing other videos with the same background music is improved, and the videos can be queried in one step without multiple interactions.

A video list interface of the same geographical location indicated by the geographical location information is displayed in response to a third trigger operation of a geographical location tag in the video introduction information.

In this embodiment, the video list interface of the same geographical location indicated by the geographical location information is displayed in response to the third trigger operation of the geographical location tag in the video introduction information. When the user is interested in certain geographical location, other videos with the same geographical location can be quickly viewed. As a result, the human-computer interaction efficiency of the user viewing other videos with the same geographical location is improved, and the videos can be queried in one step without multiple interactions.

In one exemplary example of this embodiment, the human-computer interaction module 1040 is configured to cancel displaying the video introduction information about the second video corresponding to the second list option in response to a cancel viewing operation of the second list option in the list options of the at least two videos.

In one exemplary example of this embodiment, the human-computer interaction module 1040 is configured to cancel displaying the picker viewer on the video list interface in response to a cancel displaying operation on the picker viewer.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The video searching apparatus provided by the above embodiments are merely exemplified by the division of the above various functional modules. In practical application, the above functional allocation can be completed by different functional modules according to needs, i.e., dividing an internal structure of a device into different functional modules to complete all or part of the above functions. In addition, the video searching apparatus provided by the above embodiments belongs to the same idea as the video searching method, and the implementation process thereof is described in detail in the embodiments of the method, and will not be repeated here.

The embodiment of the present disclosure also provides a computer device, including: a processor and a memory, the memory storing at least one instruction, at least one piece of program, a code set, or an instruction set loaded and executed by the processor to implement the video searching method provided by the above embodiments.

Figure 11:
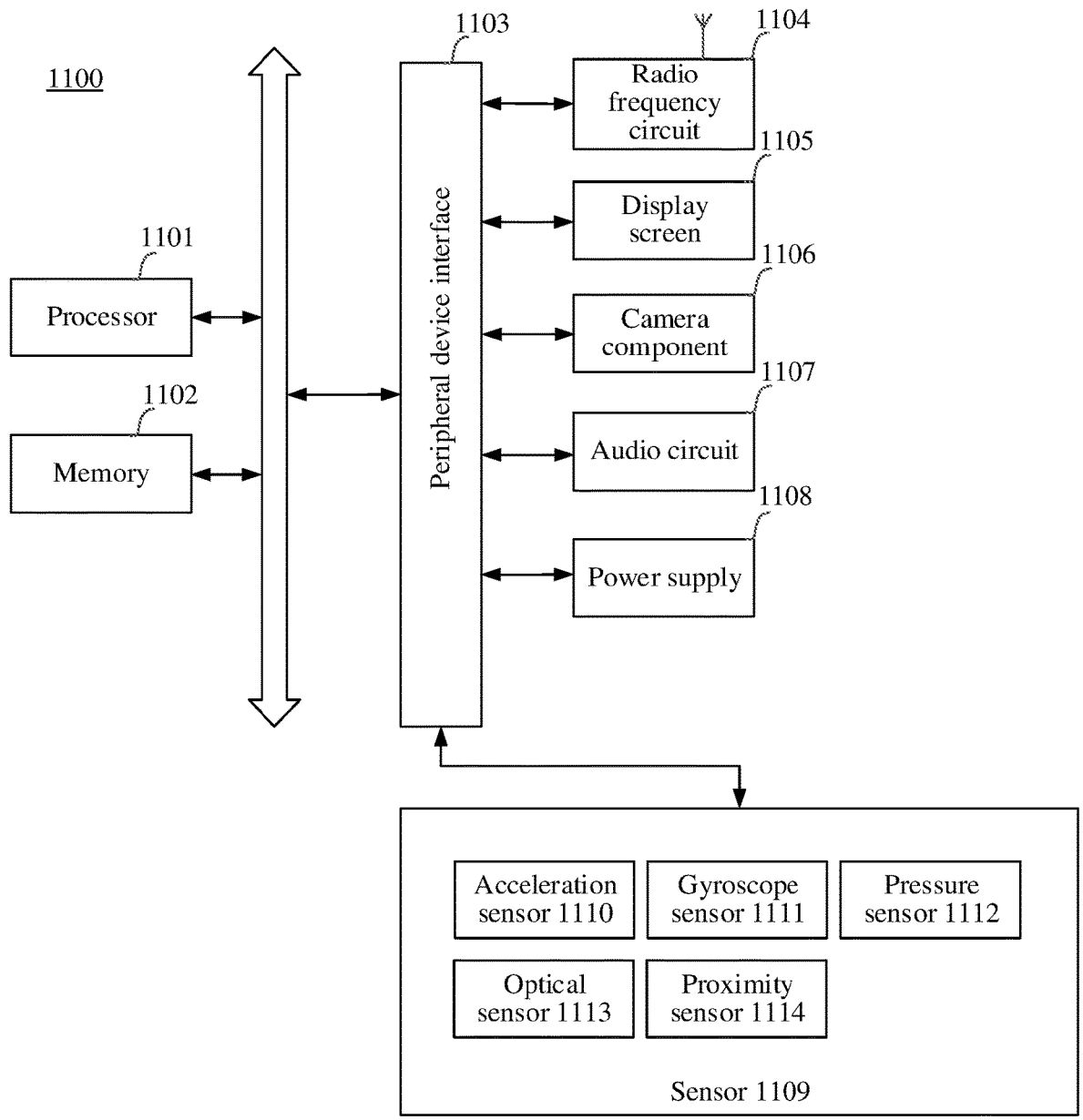
FIG. 11 is a structural block diagram of a terminal provided by an exemplary embodiment of the present disclosure.

In some embodiments, the computer device is a terminal. Illustratively, FIG. 11 is a block diagram of a terminal provided by an exemplary embodiment of the present disclosure.

Generally, the terminal 1100 includes: a processor 1101 and a memory 1102.

The processor 1101 may include one or more processing cores, for example, a 4-core processor or an 8-core processor. The processor 1101 may be implemented in at least one hardware form of digital signal processing (DSP), field-programmable gate array (FPGA), and programmable logic array (PLA). The processor 1101 may also include a main processor and a co-processor. The main processor is configured to process data in a wake-up state, also referred to as a central processing unit (CPU). The co-processor is a low-power processor configured to process data in a standby state. In some embodiments, the processor 1101 may be integrated with a graphics processing unit (GPU). The GPU is configured to render and draw the content that the display screen needs to display. In some embodiments, the processor 1101 may further include an artificial intelligence (AI) processor. The AI processor is configured to process computing operations related to machine learning.

The memory 1102 may include one or more computer-readable storage media. The computer-readable storage medium may be non-transient. The memory 1102 may further include a high-speed random access memory and a nonvolatile memory, for example, one or more disk storage devices or flash storage devices. In some embodiments, the non-transient computer-readable storage medium in the memory 1102 is configured to store at least one instruction. The at least one instruction is used for being executed by the processor 1101 to achieve the video searching method provided by the embodiments of the present disclosure.

In some embodiments, the terminal 1100 may also include: a peripheral device interface 1103 and at least one peripheral device. The processor 1101, the memory 1102, and the peripheral device interface 1103 may be connected via a bus or a signal line. Each peripheral device may be connected to the peripheral device interface 1103 via a bus, a signal line, or a circuit board. Specifically, the peripheral device includes: at least one of a radio frequency (RF) circuit 1104, a display screen 1105, a camera component 1106, an audio circuit 1107, and a power supply 1108.

The peripheral device interface 1103 may be configured to connect at least one peripheral device related to input/output (I/O) to the processor 1101 and the memory 1102. In some embodiments, the processor 1101, the memory 1102, and the peripheral device interface 1103 are integrated on the same chip or the same circuit board. In some other embodiments, any one or two of the processors 1101, the memory 1102, and the peripheral device interface 1103 may be implemented on a separate chip or circuit board, which is not limited by the embodiments of the present disclosure.

The RF circuit 1104 is configured to receive and transmit an RF signal, also referred to as an electromagnetic signal. The RF circuit 1104 communicates with a communication network and other communication devices through the electromagnetic signal. The RF circuit 1104 converts an electrical signal into an electromagnetic signal for transmission, or converts a received electromagnetic signal into an electrical signal. In some embodiments, the RF circuit 1104 includes: an antenna system, an RF transceiver, one or more amplifiers, a tuner, an oscillator, a digital signal processor, a codec chip set, a user identity module card, and the like. The RF circuit 1104 may communicate with other terminals through at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (WiFi) network. In some embodiments, the RF circuit 1104 may further include a circuit related to NFC, which is not limited in the present disclosure.

The display screen 1105 is configured to display a user interface (UI). The UI may include a graph, text, an icon, a video, and any combination thereof. When the display screen 1105 is a touch display screen, the display screen 1105 also has the ability to acquire a touch signal on or above the surface of the display screen 1105. The touch signal may be inputted to the processor 1101 as a control signal for processing. At this time, the display screen 1105 may also be configured to provide a virtual button and/or a virtual keyboard, also referred to as a soft button and/or a soft keyboard. In some embodiments, there may be one display screen 1105 provided on a front panel of the terminal 1100. In other embodiments, there may be at least two display screens 1105 provided on different surfaces of the terminal 1100 respectively, or in a folded design. In still other embodiments, the display screen 1105 may be a flexible display screen provided on a curved or folded surface of the terminal 1100. Even, the display screen 1105 may be further set in a non-rectangular irregular pattern, namely, a special-shaped screen. The display screen 1105 may be prepared by using materials such as a liquid crystal display (LCD), an organic light-emitting diode (OLED), or the like.

The camera component 1106 is configured to acquire images or videos. In some embodiments, the camera component 1106 includes a front camera and a rear camera. Typically, the front camera is provided on the front panel of the terminal 1100 and the rear camera is provided on the back of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1106 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1107 may include a microphone and a speaker. The microphone is configured to acquire sound waves of a user and an environment, and convert the sound waves into an electrical signal to input to the processor 1101 for processing, or input to the RF circuit 1104 for implementing voice communication. For stereo acquisition or noise reduction, there may be a plurality of microphones provided at different positions on the terminal 1100. The microphone may further be an array microphone or an omni-directional acquisition type microphone. The speaker is configured to convert electrical signals from the processor 1101 or the RF circuit 1104 into sound waves. The speaker may be a film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1107 may also include a headset jack.

The power supply 1108 is configured to supply power to components in the terminal 1100. The power supply 1108 may be an alternating current power, a direct current power, a disposable battery, or a rechargeable battery. When the power supply 1108 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1100 further includes one or more sensors 1109. The one or more sensors 1109 include, but are not limited to: an acceleration sensor 1110, a gyroscope sensor 1111, a pressure sensor 1112, an optical sensor 1113, and a proximity sensor 1114.

The acceleration sensor 1110 can detect the magnitude of acceleration on three coordinate axes of a coordinate system established with the terminal 1100. For example, the acceleration sensor 1110 may be configured to detect the component of gravitational acceleration on three coordinate axes. The processor 1101 can control the touch display screen 1105 to display the UI in a transverse or longitudinal view according to gravity acceleration signals acquired by the acceleration sensor 1110. The acceleration sensor 1110 may also be configured to acquire motion data of a game or a user.

The gyroscope sensor 1111 may detect a body direction and a rotation angle of the terminal 1100. The gyroscope sensor 1111 may cooperate with the acceleration sensor 1110 to acquire a 3D action by the user on the terminal 1100. Based on the data acquired by the gyroscope sensor 1111, the processor 1101 performs the following functions: motion sensing (such as changing the UI according to a tilting operation of the user), image stabilization of photographing, game control, and inertial navigation.

The pressure sensor 1112 may be provided on a side frame of the terminal 1100 and/or a lower layer of the touch display screen 1105. When the pressure sensor 1112 is provided on the side frame of the terminal 1100, a grip signal of the user to the terminal 1100 can be detected, and the processor 1101 performs left-right hand recognition or a rapid operation according to the grip signal acquired by the pressure sensor 1112. When the pressure sensor 1112 is provided on the lower layer of the touch display screen 1105, the processor 1101 controls an operable control on the UI according to a pressure operation of the user on the touch display screen 1105. The operable control includes at least one of a button control, a scroll-bar control, an icon control, and a menu control.

The optical sensor 1113 is configured to acquire ambient light intensity. In an embodiment, the processor 1101 may control the display brightness of the touch display screen 1105 according to the ambient light intensity acquired by the optical sensor 1113. Specifically, when the ambient light intensity is high, the display brightness of the touch display screen 1105 is turned up; when the ambient light intensity is low, the display brightness of the touch display screen 1105 is turned down. In another embodiment, the processor 1101 may further dynamically adjust a camera parameter of the camera component 1106 according to the ambient light intensity acquired by the optical sensor 1113.

The proximity sensor 1114, also referred to as a distance sensor, is typically provided on the front panel of the terminal 1100. The proximity sensor 1114 is configured to acquire a distance between the user and a front surface of the terminal 1100. In an embodiment, when the proximity sensor 1114 detects that the distance between the user and the front surface of the terminal 1100 gradually decreases, the processor 1101 controls the touch display screen 1105 to switch from a light-up state to a lock state. When the proximity sensor 1114 detects that the distance between the user and the front surface of the terminal 1100 gradually increases, the processor 1101 controls the touch display screen 1105 to switch from the lock state to the light-up state.

It is to be understood by a person skilled in the art that the structure shown in FIG. 11 is not limiting of the terminal 1100 and may include more or fewer components than shown, or some components may be combined, or a different arrangement of components may be employed.

In the embodiment of the present disclosure, a computer-readable storage medium is also provided. The computer-readable storage medium stores at least one piece of program code. When the program code is loaded and executed by the processor of the computer device, the video searching method provided by the various embodiments described above is implemented.

The present disclosure also provides a computer program product or a computer program. The computer program product or the computer program includes computer instructions. The computer-readable storage medium stores the computer instructions. A processor of a computer device reads the computer instructions from the computer-readable storage medium and executes the computer instructions to cause the computer device to perform the video searching method provided by the various embodiments described above.

What is claimed is:

1. A video searching method, the method being performed by a terminal, and the method comprising:
 displaying a video list interface configured to show video covers of at least two a plurality of videos from a same video collection, the video covers each comprising a cover graph or a cover icon;
 in response to a number of the plurality of videos in the same video collection being greater than a quantity threshold, displaying a first button on the video list interface, wherein a search trigger operation includes a selection of the first button;
 in response to the number of the plurality of videos in the same video collection being not greater than the quantity threshold, monitoring a gesture operation on the video list interface, wherein the search trigger operation includes a gesture operation conforming to a first gesture;
 displaying a picker viewer on the video list interface in response to the search trigger operation, wherein the picker viewer is overlaid on the video covers and includes list options of the plurality of videos in the same video collection, each list option corresponds to one of the plurality of videos in the same video collection and is represented by only relevant text of the corresponding video, list options of at least two videos from the plurality of videos being displayed on the picker viewer, and the list options of the plurality of videos in the same video collection further include a hidden list option that is displayable through a scrolling manner; and
 displaying a playing interface of a first video corresponding to a first list option in response to a selection operation on the first list option in the list options.

2. The method according to claim 1, wherein the displaying a picker viewer on the video list interface in response to a search trigger operation comprises:
 displaying the picker viewer on a visual focus region of the video list interface in response to the search trigger operation.

3. The method according to claim 2, wherein the displaying the picker viewer on a visual focus region of the video list interface in response to the search trigger operation comprises:
 switching the video list interface to a lost focus state in response to the search trigger operation;
 displaying the picker viewer in a focus state on the visual focus region of the video list interface in the lost focus state.

4. The method according to claim 1, further comprising:
 determining that the search trigger operation is received in response to receiving the gesture operation conforming to the first gesture.

5. The method according to claim 4, wherein the gesture operation conforming to the first gesture includes: two successive gesture operations having a time interval less than a duration threshold.

6. The method according to claim 1, further comprising:
 determining that the search trigger operation is received in response to receiving the search trigger operation on the first button on the video list interface, the first button being configured to trigger and display the picker viewer.

7. The method according to claim 1, further comprising:
 displaying a list option located at a preset option position on the picker viewer as a first list option in a default selected state.

8. The method according to claim 1, further comprising:
 displaying a list option at a preset option position on the picker viewer during scrolling as a first list option in a selected state in response to a scrolling operation on the picker viewer.

9. The method according to claim 1, wherein the displaying a playing interface of a first video corresponding to a first list option in response to a selection operation on the first list option in the list options comprises:
displaying the playing interface of the first video corresponding to the first list option in response to a trigger operation of a confirmation control on the picker viewer or a trigger operation triggered on the first list option.

10. The method according to claim 1, further comprising:
displaying a title of the picker viewer as an episode title of a first episode when the first video corresponding to the first list option belongs to the first episode.

11. The method according to claim 1, further comprising:
displaying a background graph of the picker viewer as an episode poster cover of a first episode when the first video corresponding to the first list option belongs to the first episode.

12. The method according to claim 1, further comprising:
displaying video introduction information about a second video corresponding to a second list option in response to a viewing operation on the second list option in the list options, wherein the video introduction information and the picker viewer are simultaneously displayed on the video list interface and overlaid on the video covers.

13. The method according to claim 12, further comprising at least one of:
displaying a playing interface of the second video in response to a first trigger operation of a video name, a video cover, or a video profile in the video introduction information;
displaying a video list interface of a same background music indicated by a background music information in response to a second trigger operation of the background music information in the video introduction information; or
displaying a video list interface of a same geographical location indicated by a geographical location information in response to a third trigger operation of a geographical location tag in the video introduction information.

14. The method according to claim 12, further comprising:
canceling displaying the video introduction information about the second video corresponding to the second list option in response to a cancel viewing operation of the second list option in the list options.

15. The method according to claim 1, further comprising:
canceling displaying the picker viewer on the video list interface in response to a cancel displaying operation on the picker viewer.

16. A video searching apparatus, comprising: a processor and a memory, the memory storing at least one piece of program loaded and execute by the processor, the processor being configured to:
display a video list interface configured to show video covers of at least two a plurality of videos from a same video collection, the video covers each comprising a cover graph or a cover icon;
in response to a number of the plurality of videos from the same video collection being greater than a quantity threshold, display a first button on the video list interface, wherein a search trigger operation includes a selection of the first button;
in response to the number of the plurality of videos from the same video collection being not greater than the quantity threshold, monitor a gesture operation on the video list interface, wherein the search trigger operation includes a gesture operation conforming to a first gesture;
display a picker viewer on the video list interface in response to the search trigger operation, wherein the picker viewer is overlaid on the video covers and includes list options of the plurality of videos in the same video collection, each list option corresponds to one of the plurality of videos in the same video collection and is represented by only relevant text of the corresponding video, list options of at least two videos from the plurality of videos being displayed on the picker viewer, and the list options of the plurality of videos in the same video collection further include a hidden list option that is displayable through a scrolling manner; and
display a playing interface of a first video corresponding to a first list option in response to a selection operation on the first list option in the list options.

17. The apparatus according to claim 16, wherein when displaying the picker viewer on the video list interface, the processor is further configured to:
display the picker viewer on a visual focus region of the video list interface in response to the search trigger operation.

18. The apparatus according to claim 17, wherein when displaying the picker viewer on the visual focus region of the video list interface in response to the search trigger operation, the processor is further configured to:
switch the video list interface to a lost focus state in response to the search trigger operation; and
display the picker viewer in a focus state on the visual focus region of the video list interface in the lost focus state.

19. A non-transitory computer-readable storage medium, the computer-readable storage medium storing at least one piece of program loaded and executed by a processor to implement:
displaying a video list interface configured to show video covers of at least two a plurality of videos from a same video collection, the video covers each comprising a cover graph or a cover icon;
in response to a number of the plurality of videos in the same video collection being greater than a quantity threshold, displaying a first button on the video list interface, wherein a search trigger operation includes a selection of the first button;
in response to the number of the plurality of videos in the same video collection being not greater than the quantity threshold, monitoring a gesture operation on the video list interface, wherein the search trigger operation includes a gesture operation conforming to a first gesture;
displaying a picker viewer on the video list interface in response to the search trigger operation, wherein the picker viewer is overlaid on the video covers and includes list options of the plurality of videos in the same video collection, each list option corresponds to one of the plurality of videos in the same video collection and is represented by only relevant text of the corresponding video, list options of at least two videos from the plurality of videos being displayed on the picker viewer, and the list options of the plurality of videos in the same video collection further include a hidden list option that is displayable through a scrolling manner; and displaying a playing interface of a first video corresponding to a first list option in response to a selection operation on the first list option in the list options.

\* \* \* \* \*